Figure 1:
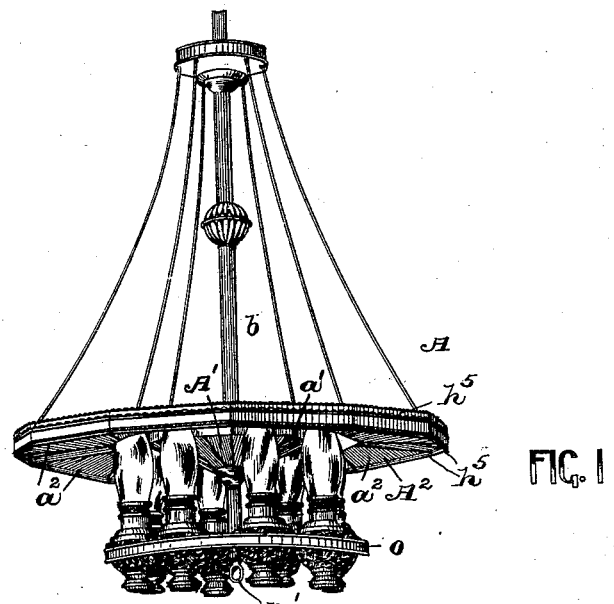

(No Model.) 4 Sheets—Sheet 1.

N. WEEKS.
CHANDELIER REFLECTOR.

No. 581,094. Patented Apr. 20, 1897.

WITNESSES:
W. B. Fraentzel.
Jno. H. Canfield Jr.

INVENTOR:
NELSON WEEKS,
BY
Fred L. C. Fraentzel.
ATTORNEY (No Model.)  4 Sheets—Sheet 2.

N. WEEKS.
CHANDELIER REFLECTOR.

No. 581,094. Patented Apr. 20, 1897.

WITNESSES:
W. B. Fraentzel,
Wm. H. Canfield, Jr.

INVENTOR:
NELSON WEEKS,
BY Fred C. Fraentzel,
ATTORNEY

THE NORRIS PETERS CO., PHOTO-LITHO., WASHINGTON, D. C.

(No Model.) 4 Sheets—Sheet 3.
N. WEEKS.
CHANDELIER REFLECTOR.
No. 581,094. Patented Apr. 20, 1897.
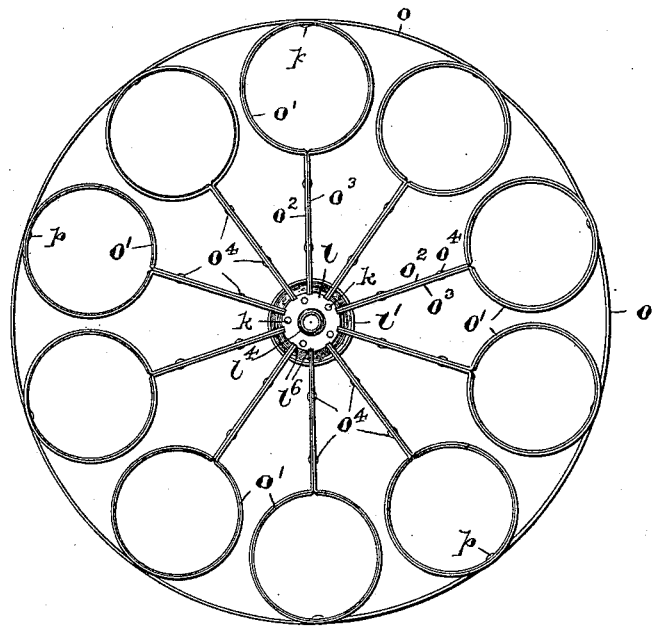
FIG. 9
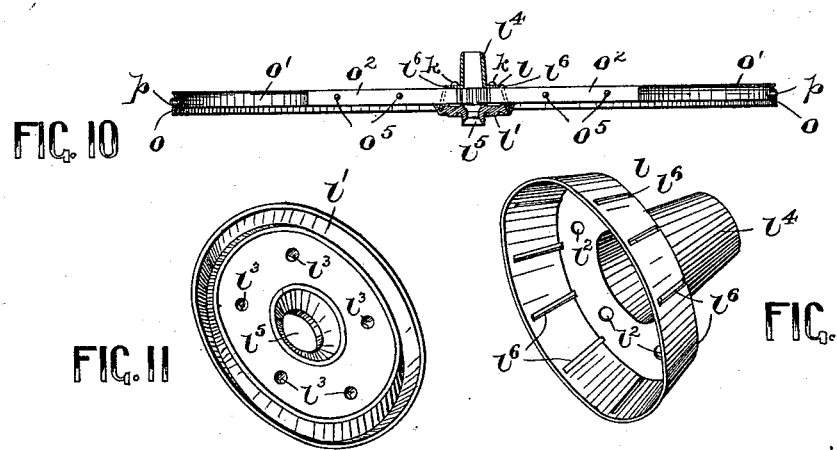
FIG. 10
FIG. 11
FIG. 12
WITNESSES:
W. B. Fraentzel.
Wm. H. Canfield, Jr.
INVENTOR:
NELSON WEEKS,
BY
Fredk C. Fraentzel,
ATTORNEY (No Model.)  4 Sheets—Sheet 4.
N. WEEKS.
CHANDELIER REFLECTOR.
No. 581,094.  Patented Apr. 20, 1897.
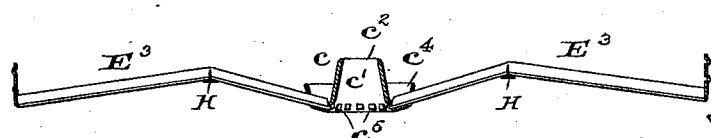
FIG. 13
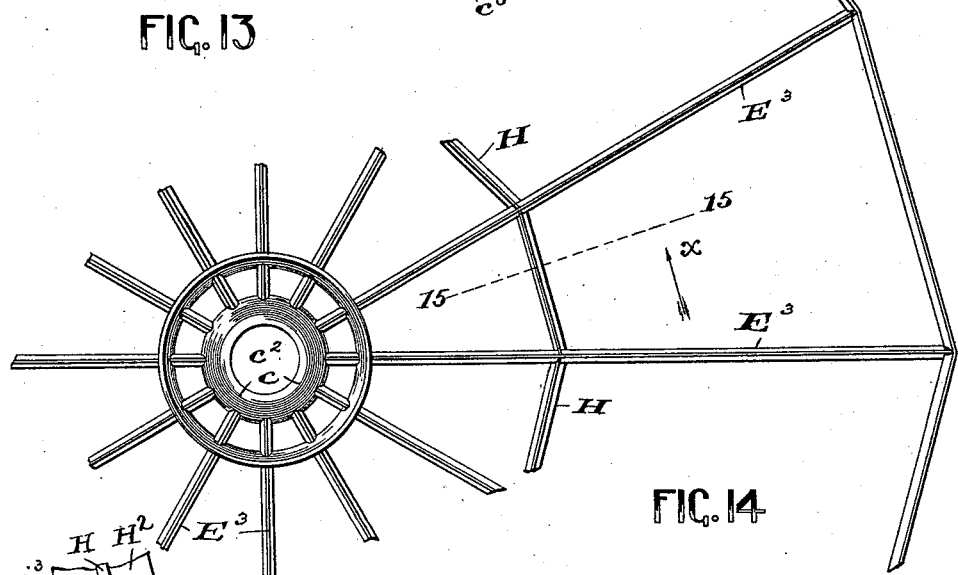
FIG. 14
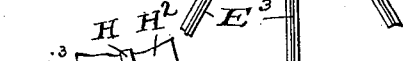
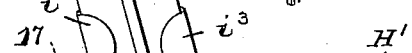
FIG. 16  FIG. 17  FIG. 18  FIG. 19
FIG. 15
WITNESSES:
N. B. Fraentzel.
Thos. H. Canfield, Jr.
INVENTOR:
NELSON WEEKS,
BY Fred'k C. Fraentzel,
ATTORNEY

UNITED STATES PATENT OFFICE.

NELSON WEEKS, OF HACKENSACK, NEW JERSEY, ASSIGNOR TO GEORGE FRINK SPENCER, OF NEWARK, NEW JERSEY.

CHANDELIER-REFLECTOR.

SPECIFICATION forming part of Letters Patent No. 581,094, dated April 20, 1897.

Application filed December 21, 1896. Serial No. 616,403. (No model.)

*To all whom it may concern:*

Be it known that I, NELSON WEEKS, a citizen of the United States, residing at Hackensack, in the county of Bergen and State of New Jersey, have invented certain new and useful Improvements in Chandelier-Reflectors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a novel construction of chandelier-reflector to be used in connection with oil, gas, or electric lamps; and the invention has for its primary objects, first, to provide a graceful and ornamental as well as a useful fixture; secondly, to provide a chandelier-reflector in which the lamps or lights are arranged in such a manner that the heat and smoke pass through an opening between two reflector-cones, thus leaving the reflecting-surfaces bright and untarnished; thirdly, to provide a chandelier-reflector in which the parts for holding the reflector-plates in position are securely connected without the use of solder or rivets, and, lastly, to provide a construction of supporting-frame which is very rigid and most safe and will carry great weights without the least danger of distorting the framework of the chandelier.

This invention therefore consists in the general arrangements and combinations of the several parts of the chandelier-reflector and the peculiar construction of certain parts thereof, all of which will be fully set forth in the accompanying specification and finally embodied in the clauses of the claim.

The invention is clearly illustrated in the accompanying sheets of drawings, in which—

Figure 2:
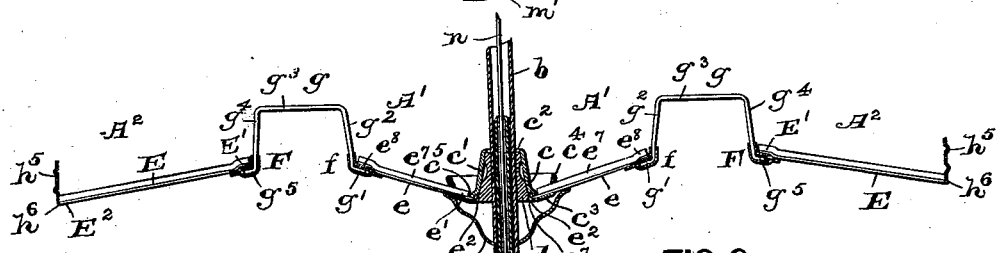
Figure 3:
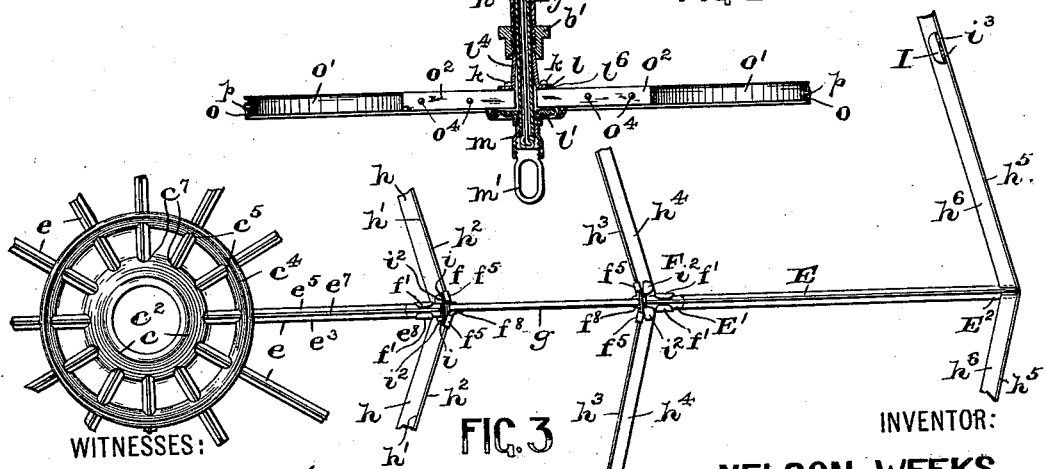
Figure 4:
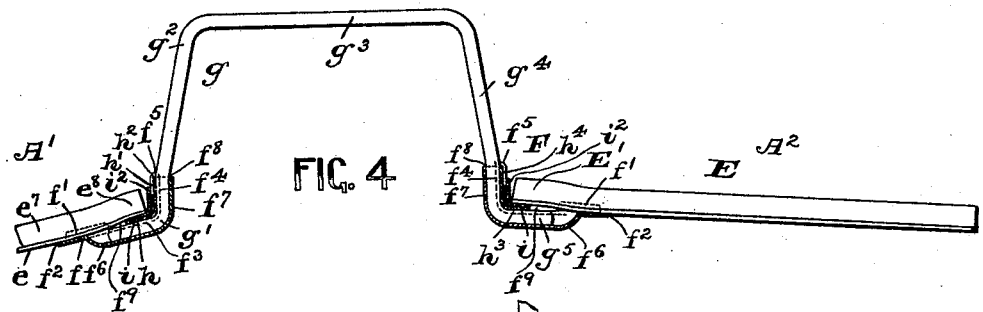
Figure 5:
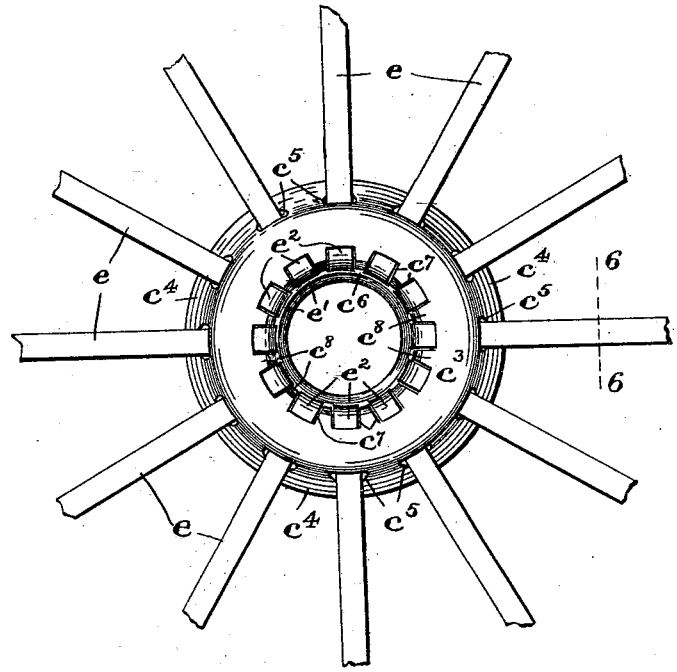
Figure 6:
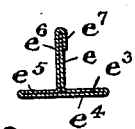
Figure 7:
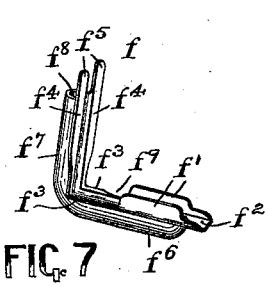
Figure 8:

Figure 1 is a perspective view of a chandelier-reflector embodying the principles of my invention constructed to carry oil-lamps. Fig. 2 is a detail section of certain portions of the framework of the reflector-cones, a vertical supporting-stem, a frame for carrying the oil-lamps, and the parts of mechanism for connecting the framework of the chandelier to said supporting-stem. Fig. 3 is a top view or plan of a portion of the framework of the reflector-cones, the reflector-plates of each cone being removed to more clearly illustrate the arrangement and construction of the several parts of said framework. Fig. 4 is an enlarged detail view of portions of the supporting-ribs of each cone, a yoke, and a clamping means, the latter being represented in section, for connecting the ends of any two of such radially and oppositely arranged supporting-ribs; and Fig. 5 is a bottom view of a center piece or hub with which the radially-arranged supporting-ribs of the inner reflector-cone are connected. Fig. 6 is a vertical cross-section taken through line 6 6 in Fig. 5 on an enlarged scale. Figs. 7 and 8 are perspective views of certain clamping devices to be used in connection with the framework of the reflector-cones for respectively connecting the several parts of the said framework and for securing the reflector-plates to the same. Fig. 9 is a plan view of the supporting-frame for carrying the oil-lamps used in connection with the chandelier-reflector illustrated in Fig. 1, and Fig. 10 is a vertical cross-section of the same. Figs. 11 and 12 are perspective views of certain parts comprising a center piece or hub in which the ends of certain radially-disposed arms of said supporting-frame are secured. Fig. 13 is a vertical cross-section of the framework and center hub of a pair of reflector-cones of a slightly-modified form of construction, but still embodying the leading features of my present invention. Fig. 14 is a plan view of certain portions of said framework illustrated in Fig. 13, but on an enlarged scale; and Fig. 15 is a cross-section taken on line 15 15 in Fig. 14 when looking in the direction of arrow *x*. Fig. 16 is a top view of one of the connecting-points of a rib and a portion of the rim of the framework of a reflector-cone, illustrating still another modified construction of joining said parts of the framework. Fig. 17 is a cross-section taken on line 17 17 in said Fig. 16, and Fig. 18 is a similar section taken on line 18 18 in the same figure. Fig. 19 is a perspective view of a clamp used in connecting the parts illustrated in said Figs. 16, 17, and 18.

Similar letters of reference are employed in all of the above-described views to indicate corresponding parts.

In said drawings, A indicates the complete chandelier-reflector. $A^2$ is the outer reflector-cone, and $A'$ is the inner reflector-cone. Said reflector-cone $A'$ is provided with suitable glass or metallic reflector-plates $a'$ and the reflector-cone $A^2$ with similar reflector-plates $a^2$, as will be evident from an inspection of Fig. 1. The framework of each reflector-cone rests directly above an ornamental centerpiece $a$, which is suitably secured to a tubular support or stem $b$ and has the central hub $c$ of the said framework securely arranged over a wooden or other like plug $d$, having a central hole, whereby it can be slipped upon the said stem and firmly secured thereto in any desired manner.

The framework for supporting the two reflector-cones $A'$ and $A^2$ comprises therein said central hub $c$, having the inner chambered portion $c'$ made conical and provided in the top with an opening $c^2$, whereby it can be slipped over the stem or rod $b$ and supported by the cone-plug $d$, as clearly represented in Fig. 2. Said hub $c$ is provided with a suitable bottom portion $c^3$, having the upwardly-extending peripheral edge $c^4$ provided with suitably-spaced openings $c^5$. In the bottom of said cup-shaped center piece or hub $c$ is an annular recess $c^6$, provided with alternately-arranged openings $c^7$ and projections $c^8$, as clearly illustrated in the several figures of the drawings. Extending into and through said openings $c^5$ in the hub $c$ are the flat ends $e'$ of certain supporting-ribs $e$, said ends $e'$ being made to pass through said openings $c^7$ in said hub $c$ and then provided with the portions $e^2$, which are bent over the annular circumferential edge of the recess $c^6$. Thus it will be evident that the ends of said ribs are permanently fixed in said openings $c^5$ and $c^7$ and also between the said projections $c^8$, hereinabove mentioned, to prevent any displacement or distortion of said ribs at the points of connection with the central hub $c$.

Each rod or rib $e$ is made of sheet metal for lightness, but to produce a rib of sufficient strength the sheet-metal rib is formed of the bent-over parts $e^3$, $e^4$, $e^5$, $e^6$, and $e^7$, substantially as illustrated more particularly in Fig. 6.

As will be seen from Figs. 2, 3, and 4, the opposite end portion $e^8$ of each radially-disposed arm or rod or rib $e$ rests between the clamping leaves or fingers $f'$ of the clamp $f$, (illustated more particularly in Fig. 7,) which are bent over and down upon said ends of the ribs $e$ to securely hold them in place upon the supporting portion $f^2$ of each clamp $f$, as will be clearly evident.

Each clamp $f$ has two straight pieces $f^4$ extending at right angles, or approximately so, to certain portions $f^3$, and $f^5$ are fingers on said pieces $f^4$, which are capable of being turned or bent over for the purposes hereinafter more fully specified. As will be more particularly noticed from an inspection of said Fig. 7, each one of the said right-angled parts of the clamp $f$ is formed with suitably-curved portions $f^6$ and $f^7$, forming receiving-sockets $f^8$ for the ends $g'$ of the yoke or bridge-pieces $g$, which are arranged in said receiving-sockets after the clamps $f$ have been attached to the ends $e^8$ of the rods or ribs $e$ by means of the clamping-fingers $f'$, as indicated in Fig. 3.

As will be seen from Figs. 3 and 4, resting on the two supporting portions $f^3$ in the spaces $f^9$, formed between the ends of the fingers $f'$ and said two upwardly-extending straight pieces $f^4$ of each clamp $f$, are the parts $h$ of certain polygonal rims forming the marginal rim or edge of the inner reflector-cone $A'$. Said part $h$ of this rim is provided with an upwardly-extending marginal edge $h'$, as clearly shown, and over the upper surface or edge $h^2$ of which the fingers $f^5$ on the clamps $f$ are bent to firmly connect all of these parts together and to form a perfectly rigid framework for the said reflector-cone $A'$.

From an inspection of Figs. 2, 3, and 4 it will be seen that the reflector-plates $a'$ are supported on the said parts $h$ of the polygonal rim and upon the respective portions or ledges $e^3$ and $e^5$ of the ribs $e$, being prevented from any accidental displacement by an arrangement of clamps of the construction represented in Fig. 8, and which comprise therein a plate or body $i$, having the part $i'$ formed at a right angle thereto, the same being provided with clamping-fingers $i^2$, substantially as shown.

The plate $i$ of each clamp is placed between the part $h$ of the polygonal rim and the lower surface of the end portion $e^8$ of a rib $e$, being securely held in place when all the parts of the joint are clamped together, as hereinabove stated, and the fingers $i^2$ are then bent down on opposite sides of the upwardly-projecting ridge of each rib $e$ and against the said reflector-plates $a'$ to secure them in position on said ribs and said part $h$ of the polygonal rim. In this manner I construct the complete inner reflector-cone $A'$, the framework whereof is rigidly connected, and without the use of solder or rivets. Each connecting yoke or bridge $g$ is preferably ⊓-shaped when viewed from the front, having the upwardly-extending portions $g^2$ and $g^4$, with the connecting cross-piece $g^3$ and a free end $g^5$, similar in arrangement to the end $g'$, on each yoke or bridge $g$ and for the same purposes. These ends $g^5$ of the said yokes or bridges $g$ are arranged in the socketed receiving portions of certain other clamps F, which are of the same construction as the clamps $f$ and to the clamping parts of which are secured, in the precise manner as hereinabove stated, the ends E' of certain radially-arranged ribs E, on which and the surface $h^4$ of a polygonal rim $h^3$ rest the glass or metallic reflector-plates $a^2$ of the reflector-cone $A^2$, clamps similar in construction to those illustrated in Fig. 8 being used at the joints in the rim $h^3$ to hold said plates $a^2$ in position on said rim. All of these parts being of the precise construction and arrangement of the several parts of the joints for connecting the ribs $e$ to the polygonal rim of the framework of the reflector-cone A', I will not further describe the arrangement and construction of these parts here. The opposite ends $E^2$ of said ribs E, which are also made from sheet metal and in the same manner as indicated in Fig. 6, have secured thereto the edge $h^6$ of the outer ornamental polygonal rim $h^5$ of the outer reflector-cone $A^2$, said ends being soldered or otherwise secured to said rim $h^5$, as will be clearly evident.

The edge $h^6$ may be provided with suitable clamps I, of the construction represented in Fig. 8, which are secured to said edge in any well-known manner and have suitable clamping portions $i^2$ adapted to be bent down upon the reflector-plates $a^2$ when they have been placed on said ribs E and the edge $h^6$ of the rim $h^5$.

From the above description it will be seen that I have provided a chandelier-reflector having two reflector-cones, with an open space between them, into which the chimneys from the lamps extend, and the heat and smoke from the lamps cannot tarnish the illuminating or reflecting surfaces of the reflector-plates, said yokes or rods $g$ being bent U-shaped, as has been stated, in order not to interfere with glass chimneys or lamps. Furthermore, a practical arrangement and cheap construction of reflector-frame is the result, which is very rigid and strong and in which the joints at those parts of the framework where there is the greatest heat are all secured together without the use of solder to prevent the melting of the latter and separation of the several parts of the framework connected at the joints.

In Figs. 2, 9, 10, and 11 I have illustrated a novel construction of oil-lamp-supporting frame to be used in connection with the herein-described chandelier-reflector. Said frame consists, essentially, of a pair of central sockets $l$ and $l'$, adapted to be secured together by means of screws or pins $k$, secured in the holes or perforations $l^2$ and $l^3$ in the respective sockets $l$ and $l'$. Said socket $l$ has a tubular hub $l^4$ and the socket $l'$ has a central opening $l^5$, whereby said sockets $l$ and $l'$, when they are secured together by the screw $k$, can be slipped on the lower end of a tube $j$ and secured thereon by means of an ornamental nut $m$, having a pull-piece $m'$, substantially as illustrated in Fig. 2. Said tube $j$ fits into the tubular support $b$, and when the chandelier is suspended from a rope or chain $n$, passing through said tubes $j$ and $b$, then the lower surface of a nut $b'$ on the lower end of the tube or stem $b$ will rest upon the upper surface or edge of the hub $l^4$ of the socket $l$, whereby the several parts are operatively connected and can be suspended from a ceiling.

The framework for supporting the lamps consists of an outer ornamental ring $o$, of sheet metal, to the inner surface of which is secured, by means of rivets or screws $p$ or in any other well-known manner, the sheet-metal rings $o'$, having the radially-arranged arms $o^2$ and $o^3$, each set of arms being formed from one continuous strip of metal and integral with a ring $o'$. Said arms $o^2$ and $o^3$ are secured together by means of suitable rivets $o^4$ and have their free ends extending into slots $l^6$ in the upper socket $l$, as clearly indicated in Fig. 10.

Of course it will be evident that when the chandelier-reflector is to be used in connection with gas or electric lighting the framework for the oil-lamps is dispensed with and the gas-jets or electric lamps are arranged upon any other suitably-constructed framework beneath the two reflector-cones A' and $A^2$.

When the chandelier is to be used in connection with electric lighting, the two reflector-cones can be made contiguous to one another, dispensing with the opening between them, as clearly illustrated in Figs. 13 and 14. In this construction the centerpiece of the framework is the same as that hereinabove described, but in place of the radial ribs $e$ and E, I use the continuous ribs $E^3$, and in place of the rim $h$ I employ a polygonal rim H, made in the manner of the ribs $e$, hereinabove described. At the points where these ribs intersect and cross each other the lower portions of the ribs $E^3$ are slotted, as at $E^4$, said parts being firmly secured together by means of solder or in any other well-known manner. In lieu of joining the said ribs E and the rim H in this manner they may be joined or connected as illustrated in Figs. 16, 17, and 18. In this instance the rim H is slotted, as at H', (see Fig. 17,) and the rim slipped down over the rib portion $E^5$ of the rib $E^3$, the parts being secured together by means of a clamping-plate I', which is suitably bent and is provided with the clamping portions $i^3$, adapted to be bent over the parts $H^2$ of the said rim H, as clearly indicated in said Figs. 16, 17, and 18. In all other respects the construction of the forms of reflectors illustrated in said Figs. 13 to 18, inclusive, is similar to that described in connection with Figs. 1, 2, 3, &c.

Changes in the forms and proportions of the several parts and in the details of construction may be made without departing from the spirit or sacrificing the advantages of my invention, and I therefore do not limit my present invention to the exact arrangements and combinations of the parts herein described and illustrated and reserve the right to make such modifications as fairly fall within the scope of this invention.

Having thus described my invention, what I claim is—

1. In a chandelier-reflector, in combination, with a supporting rod or stem and a hub $c$ arranged thereon, having openings $c^5$, an annular recess $c^6$, openings $c^7$, and projections $c^8$, of the framework for supporting reflector-plates, consisting, of radially-arranged rods or ribs, made from sheet metal and bent, as at $e$, $e^3$, $e^4$, $e^5$, $e^6$ and $e^7$, to form supporting-ledges and a stiffening-rib between said ledges, said ribs having their free ends extending through said openings $c^5$ and $c^7$ and bent over the edge of said recessed portion $c^6$, substantially as and for the purposes set forth.

2. In a chandelier-reflector, in combination, with a supporting rod or stem and a hub $c$ arranged thereon, having openings $c^5$, an annular recess $c^6$, openings $c^7$ and projections $c^8$, of radially-arranged ribs having their free ends extending through said openings $c^5$ and $c^7$ and bent over the edge of said recessed portion $c^6$, substantially as and for the purposes set forth.

3. In a chandelier-reflector, in combination, with a supporting rod or stem, a cone-plug $d$ on said rod, and a hub $c$ arranged over said plug, having openings $c^5$, an annular recess $c^6$, openings $c^7$ and projections $c^8$, of radially-arranged ribs having their free ends extending through said openings $c^5$ and $c^7$ and bent over the edge of said recessed portion $c^6$, substantially as and for the purposes set forth.

4. In a chandelier-reflector, the framework for a pair of reflector-cones, consisting, essentially, of a central hub, radial ribs $e$ and E, all made of sheet metal doubled upon itself as set forth, to form supporting-ledges, yokes or bridge-pieces, as $g$, and clamps $f$ and F for connecting the ends of said bridge-pieces or yokes to the ends of the ribs $e$ and E, said clamps comprising therein, clamping-leaves $f'$, supporting portions $f^2$, portions $f^3$ and $f^4$, clamping-fingers $f^5$ and curved portions $f^6$ and $f^7$, forming receiving-sockets $f^8$, all substantially as and for the purposes set forth.

5. In a chandelier-reflector, the framework for a pair of reflector-cones, consisting, essentially, of a central hub, radial ribs $e$ and E, all made of sheet metal doubled upon itself as set forth, to form supporting-ledges, bridge-pieces or yokes, as $g$, and clamps $f$ and F for connecting the ends of said bridge-pieces or yokes to the ends of the ribs $e$ and E, said clamps comprising therein, clamping-leaves $f'$, supporting portions $f^2$, portions $f^3$ and $f^4$, clamping-fingers $f^5$ and curved portions $f^6$ and $f^7$, forming receiving-sockets $f^8$, supporting-spaces $f^9$ on said clamps $f$, and L-shaped polygonal rims arranged on said supporting-spaces $f^9$ adapted to be clamped by said clamping-fingers $f^5$, all arranged, substantially as and for the purposes set forth.

6. In a chandelier-reflector, the framework for a pair of reflector-cones, consisting, essentially, of a central hub, radial ribs $e$ and E, all made of sheet metal doubled upon itself, as set forth, to form supporting-ledges, bridge-pieces or yokes as $g$, and clamps $f$ and F for connecting the ends of said bridge-pieces or yokes to the ends of the ribs $e$ and E, said clamps comprising therein, clamping-leaves $f'$, supporting portions $f^2$, portions $f^3$ and $f^4$, clamping-fingers $f^5$ and curved portions $f^6$ and $f^7$, forming receiving-sockets $f^8$, supporting-spaces $f^9$ on said clamps $f$, and L-shaped polygonal rims arranged on said supporting-spaces $f^9$ adapted to be clamped by said clamping-fingers $f^5$, and clamping-plates held between the edges of the polygonal rims and the ends of said ribs $e$ and E, and having clamping-fingers to clamp the reflector-plates, substantially as and for the purposes set forth.

7. In a chandelier-reflector, the combination, with a rib $e$, of sheet metal, and bent, as at $e^3$, $e^4$, $e^5$, $e^6$, and $e^7$, each rib having an end portion $e^8$, of a clamp $f$, comprising therein, clamping-leaves $f'$, adapted to clamp said portions $e^8$, supporting portions $f^2$, and portions $f^3$ and $f^4$, all substantially as and for the purposes set forth.

8. In a chandelier-reflector, the combination, with a rib $e$, of sheet metal, and bent, as at $e^3$, $e^4$, $e^5$, $e^6$, and $e^7$, of a clamp $f$, comprising therein, clamping-leaves $f'$, supporting portions $f^2$, and portions $f^3$ and $f^4$, and curved portions $f^6$ and $f^7$, forming receiving-sockets $f^8$, adapted to receive bridge-pieces $g$, substantially as and for the purposes set forth.

9. In a chandelier-reflector, the combination, with a rib $e$, and an L-shaped polygonal rim, of a clamp $f$, comprising therein, clamping-leaves $f'$, supporting portions $f^2$, portions $f^3$ and $f^4$ at right angles to each other, and clamping-fingers $f^5$ adapted to grasp said polygonal rim, substantially as and for the purposes set forth.

10. In a chandelier-reflector, a lamp-supporting frame, comprising therein, a pair of central sockets, means for securing them together, a ring $o$, and lamp-supporting rings $o'$ secured to said ring $o$, having arms $o^2$ and $o^3$ formed integral with said rings $o'$, secured together, as set forth, and having their free ends connected with one of said sockets, substantially as and for the purposes set forth.

11. In a chandelier-reflector, a lamp-supporting frame, comprising therein, a pair of central sockets, means for securing them together, a ring $o$, and lamp-supporting rings $o'$ secured to said ring $o$, having arms $o^2$ and $o^3$ formed integral with said rings $o'$, slots $l^6$ in the socket $l$, said arms $o^2$ and $o^3$ having their free ends arranged in said slots $l^6$ of said socket $l$, substantially as and for the purposes set forth.

12. In a chandelier-reflector, the combination, with a tubular support $b$ having a nut $b'$ on the end thereof, of a tube $j$ and a nut $m$ thereon, a pair of central sockets $l$ and $l'$, slots $l^6$ in said socket $l$, and a lamp-supporting frame connected with said sockets, comprising therein, a ring $o$, and lamp-supporting rings $o'$ secured to said ring $o$, having arms $o^2$ and $o^3$ formed integral with said rings $o'$, secured together, as set forth, and having their free ends arranged in said slots $l^6$ in said socket $l$, substantially as and for the purposes set forth.

In testimony that I claim the invention set forth above I have hereunto set my hand this 15th day of December, 1896.

NELSON WEEKS.

Witnesses:
GEO. FRINK SPENCER,
FREDK. C. FRAENTZEL.